(12) United States Patent
Oksman

(10) Patent No.: US 9,141,277 B2
(45) Date of Patent: Sep. 22, 2015

(54) RESPONDING TO A DYNAMIC INPUT

(75) Inventor: Markku Olavi Oksman, Turku (FI)

(73) Assignee: Nokia Technologies Oy, Espoo (FI)

( * ) Notice: Subject to any disclaimer, the term of this patent is extended or adjusted under 35 U.S.C. 154(b) by 201 days.

(21) Appl. No.: 13/536,363

(22) Filed: Jun. 28, 2012

(65) Prior Publication Data

US 2014/0002372 A1  Jan. 2, 2014

(51) Int. Cl.
*G06F 3/0488* (2013.01)
*H04B 1/3816* (2015.01)
*H04M 1/02* (2006.01)

(52) U.S. Cl.
CPC ............ *G06F 3/0488* (2013.01); *H04B 1/3816* (2013.01); *H04M 1/0202* (2013.01); *H04M 2250/22* (2013.01)

(58) Field of Classification Search
CPC ...................................... G06F 3/0488
USPC .................................. 345/173–179
See application file for complete search history.

(56) References Cited

U.S. PATENT DOCUMENTS

| 2001/0013083 | A1* | 8/2001 | Nakamura | 711/111 |
| 2006/0242607 | A1* | 10/2006 | Hudson | 715/863 |
| 2009/0083847 | A1* | 3/2009 | Fadell et al. | 726/16 |
| 2012/0129495 | A1* | 5/2012 | Chae et al. | 455/411 |
| 2013/0002796 | A1* | 1/2013 | Hiller et al. | 348/14.01 |

* cited by examiner

*Primary Examiner* — Kevin Nguyen
*Assistant Examiner* — Cory Almeida
(74) *Attorney, Agent, or Firm* — McClure and Associates, PLLC

(57) ABSTRACT

Apparatus comprises at least one processor and at least one memory including computer program code, the at least one memory and the computer program code configured, with the at least one processor, to cause the apparatus to be responsive to receipt of a dynamic input by a touch-sensitive transducer of an electronic device configured to receive a removable member to cause actuation of the removable member relative to the electronic device.

20 Claims, 4 Drawing Sheets

RESPONDING TO A DYNAMIC INPUT

FIELD

The invention relates to a method and apparatus for responding to a dynamic input.

BACKGROUND

It is common for electronic devices to utilise removable memory media. Such memory media include CDs, DVDs, memory cards and SIM cards. On larger portable electronic devices such as laptops, an electronic button is sometimes provided, depression of which causes the removable memory media to be ejected. In smaller portable devices, such as smart phones and tablet computers, manual ejection mechanisms are commonly used.

SUMMARY

In a first aspect, this specification describes apparatus comprising at least one processor and at least one memory including computer program code, the at least one memory and the computer program code configured, with the at least one processor, to cause the apparatus to be responsive to receipt of a dynamic input by a touch-sensitive transducer of an electronic device configured to receive a removable member to cause actuation of the removable member relative to the electronic device.

The direction of movement of the dynamic input may correspond to the direction of actuation of the removable member.

The at least one memory and the computer program code may be configured, with the at least one processor, to cause the apparatus to determine a location of the dynamic input on the touch sensitive transducer, and to be responsive to the receipt of the dynamic input to cause actuation of the removable member relative to the electronic device, only if the location of the dynamic input corresponds to a predetermined location on the touch sensitive transducer. The predetermined location relative to the touch sensitive transducer may correspond to a location of the removable member relative to the electronic device. The predetermined location may overlie the location of the removable member when the removable member is received in the electronic device.

The removable member may be a removable memory medium.

The at least one memory and the computer program code may be configured, with the at least one processor, to cause the apparatus to be responsive to receipt of the dynamic input by the touch-sensitive transducer to cause at least one processing operation associated with the memory medium to be shut down and, subsequently, to cause actuation of the removable member relative to the electronic device.

The at least one memory and the computer program code may be configured, with the at least one processor, to cause the apparatus to cause a visual indicator to be displayed on a display screen, and thereafter to be responsive to receipt of the dynamic input to cause actuation of the removable member relative to the electronic device, wherein the visual indicator is configured to indicate a location on the touch-sensitive transducer at which the dynamic touch input should be provided in order to cause actuation of the removable memory medium. The display screen and the touch-sensitive transducer together may form a touchscreen, and the visual indicator may be provided at a location of the touchscreen at which the dynamic input should be provided in order to cause the removable member to be actuated.

In a second aspect, this specification describes a method comprising responding to receipt of a dynamic input by a touch-sensitive transducer of an electronic device configured to receive a removable member by causing actuation of the removable member relative to the electronic device.

In a third aspect, this specification describes a non-transitory computer-readable storage medium having stored thereon computer-readable code, which, when executed by computing apparatus, causes the computer apparatus to be responsive to receipt of a dynamic input by a touch-sensitive transducer of an electronic device configured to receive a removable member to cause actuation of the removable member relative to the electronic device.

In a fourth aspect, this specification describes computer-readable code which, when executed by computing apparatus, causes the apparatus to perform a method according to the first aspect.

In a fifth aspect, this specification describes apparatus comprising means for responding to receipt of a dynamic input by a touch-sensitive transducer of an electronic device configured to receive a removable member by causing actuation of the removable member relative to the electronic device. A direction of movement of the dynamic input may correspond to the direction of actuation of the removable member.

The apparatus may comprise means for determining a location of the dynamic input on the touch sensitive transducer, and means for responding to the receipt of the dynamic input by causing actuation of the removable member relative to the electronic device, only if the location of the dynamic input corresponds to a predetermined location on the touch sensitive transducer. The predetermined location relative to the touch sensitive transducer may correspond to a location of the removable member relative to the electronic device. The predetermined location may overlie the location of the removable member when the removable member is received in the electronic device.

The removable member may be a removable memory medium. The apparatus may comprise means for responding to receipt of the dynamic input by the touch-sensitive transducer by causing at least one processing operation associated with the memory medium to be shut down and, subsequently, causing actuation of the removable member relative to the electronic device.

The apparatus may comprise means for causing a visual indicator to be displayed on a display screen, and means for responding thereafter to receipt of the dynamic input by causing actuation of the removable member relative to the electronic device, wherein the visual indicator is configured to indicate a location on the touch-sensitive transducer at which the dynamic touch input should be provided in order to cause actuation of the removable memory medium. The display screen and the touch-sensitive transducer may together form a touchscreen, and the visual indicator may be provided at a location of the touchscreen at which the dynamic input should be provided in order to cause the removable member to be actuated.

BRIEF DESCRIPTION OF THE FIGURES

For a more complete understanding of example embodiments, reference is now made to the following description taken in connection with the accompanying drawings in which.

DETAILED DESCRIPTION OF EXAMPLE EMBODIMENTS

Figure 1:
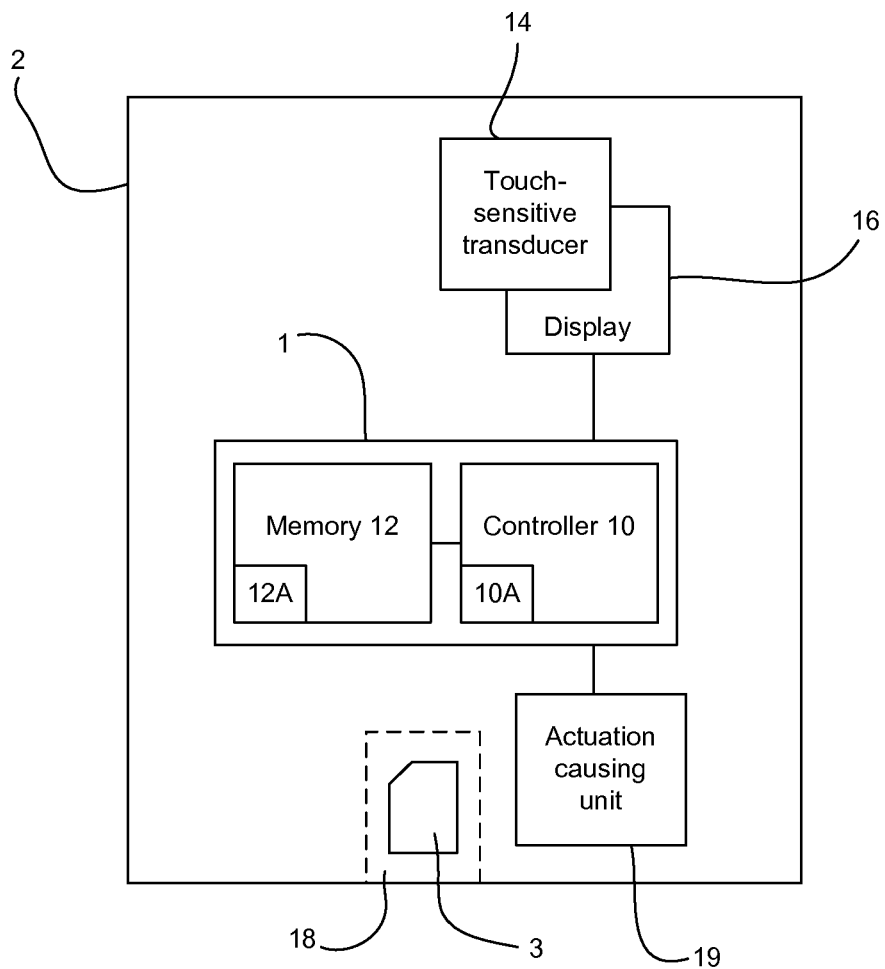
FIG. 1 is a schematic illustration of apparatus according to example embodiments.

In the description and drawings, like reference numerals refer to like elements throughout.

FIG. 1 is a schematic illustration of an apparatus 1 for causing actuation of a removable member 3 relative to an electronic device 2. The electronic device 2 is configured to receive the removable member 3. The removable member 3 may be, for example, a subscriber identity module (SIM) card, a flash memory card or an optical storage disk. The electronic device 2 may be, for example, a mobile telephone, a tablet computer, a laptop computer, a portable music player or any other type of electronic device configured to receive a removable memory medium.

The apparatus 1 comprises a controller 10 and at least one non-transitory memory medium 12. The controller 10 comprises at least one processor 10A which is configured to execute computer-readable code 12A stored in the at least one memory 12. The controller 1 is operable to store data in and/or to retrieve data from the at least one memory 12. The controller 10 is operable, under the control of the computer-readable code 12A, to control other components of an electronic device 2 in which the apparatus 1 resides. The apparatus 1 may be referred to as processing apparatus 1.

The at least one processor 10A may comprise any suitable type, or any combination of suitable types, of processor or microprocessor. The controller 10 may also comprise one or more application specific integrated circuits (not shown). The at least one memory 12 may comprise any suitable type, or any combination of suitable types of memory medium. Suitable types of memory medium include, but are not limited to ROM, RAM and flash memory.

In this example, the electronic device 2 comprises, in addition to the processing apparatus 1, a touch-sensitive transducer 14. The touch sensitive transducer 14 is responsive to tactile inputs incident thereon to output to the controller 10 signals indicative of the tactile inputs. Based on the received signals, the controller 10 is operable to determine a location (or locations) of a received tactile input. The controller 10 is operable also to determine a direction of movement of dynamic tactile inputs received at touch-sensitive transducer 14. A dynamic tactile input may also be referred to as a "swipe" input and comprises a user sliding their finger across the surface of the display from a first location to a second location. The controller 10 is operable to cause actions and/or operations to be performed based on the signals received from the touch sensitive transducer 14.

The electronic device 2 also comprises a display panel 16. The controller 10 is operable to cause images to be displayed on the display panel 16. The display panel 16 may be of any suitable type. Similarly, the touch-sensitive transducer 14 may be of any suitable type. In this example, the touch-sensitive transducer 14 overlies the display panel 16 and together the touch-sensitive transducer 14 and display panel form part of a touchscreen 14, 16. However, in other examples, the touch-sensitive transducer 14 may be a touch pad that is separate from the display 16.

The electronic device 2 is configured to receive the removable memory medium 3 in a cavity 18, or slot, formed therein. When the removable memory 12 medium 3 is received in the cavity 18 (hereafter referred to as "inserted") it is coupled with a suitable interface (not shown) for allowing the controller 10 to cause data to be written to and retrieved from the removable memory medium 3. The removable memory 12 medium is slidable, or actuatable, between its inserted state and an ejected state, in which the memory 12 medium 3 is not received in the cavity 18. In the ejected state, the removable memory 12 medium can be removed from the device 3. The removable memory medium 3 may be actuated directly or may be received in a slidable tray (not shown).

The electronic device 2 also comprises an actuation causing unit 19. The actuation causing unit 19 is operable under the control of the controller 10 to cause the removable memory medium 3 to be actuated from the inserted state to the ejected state. The actuation causing unit 19 may be, for example, a motor which causes actuation of a tray holding the removable memory medium 3. In other examples, the actuation 19 causing unit may be a latch mechanism. In such examples, the electronic device 2 comprises a biasing member (not shown). The biasing member 19 biases the removable memory medium 3 towards its ejected state. However, when the removable memory medium 3 is forced into its inserted state, the latch mechanism engages the removable memory medium 3, either directly or indirectly, thereby preventing the actuation to the ejected state. When the latch mechanism is controlled by the controller 10 to disengage the removable memory 12 medium, the biasing means urges the removable memory medium to the ejected state. As will be understood from the below description, any suitable mechanism may be utilised to actuate the removable memory medium 3, as long as the actuation can be caused by the controller 10.

In some examples, the electronic device 3 may be configured such that the controller 10 is operable to cause the removable memory medium 3 to be actuated from an ejected state to an inserted state. In such examples, the actuation causing unit 19 is operable to cause actuation of the removable memory medium in two, opposite directions.

Figure 2C:
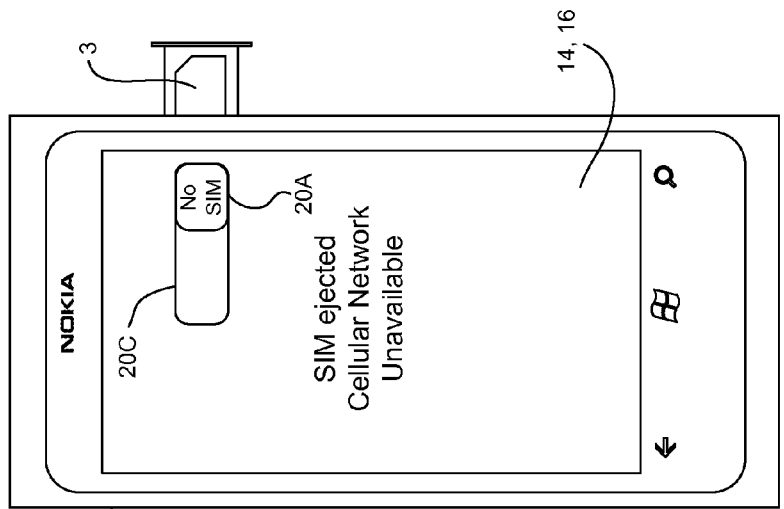
FIGS. 2A to 2C illustrate a method in accordance with example embodiments.
Figure 2B:
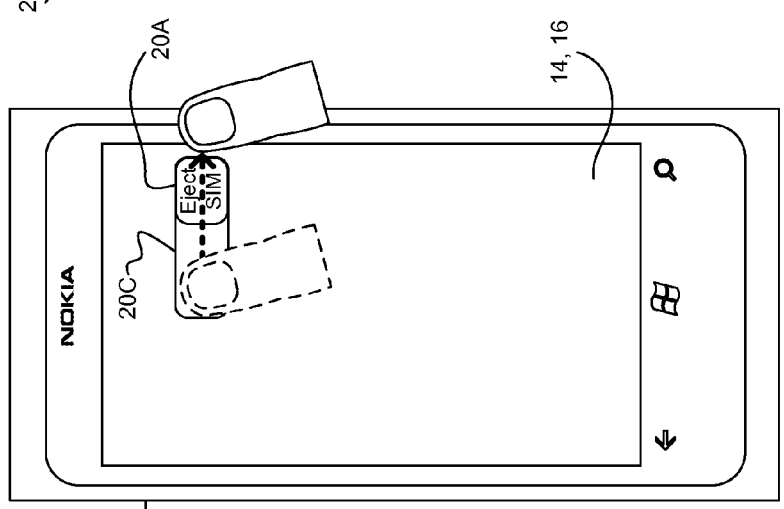
Figure 2A:
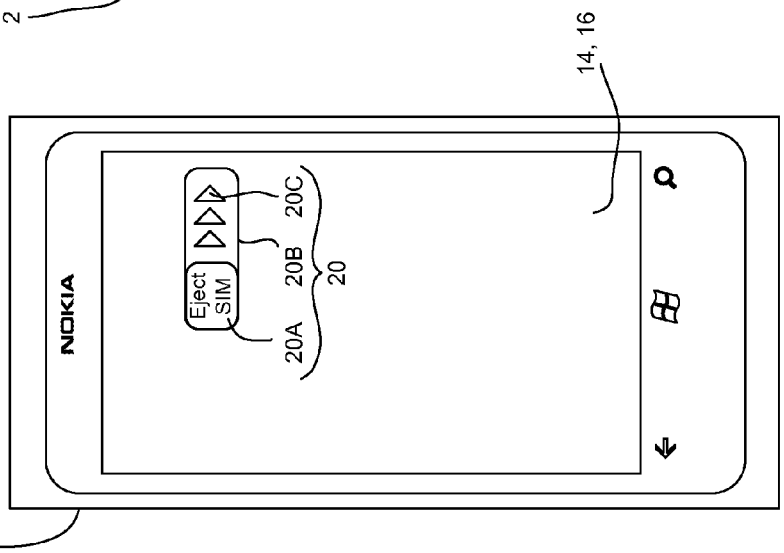

FIGS. 2A to 2C illustrate operations in accordance with example embodiments. In this example, the electronic device 2 is a mobile telephone. In this example, the electronic device comprises a touchscreen 14, 16.

In FIG. 2A, the controller 10 is causing a visual indicator 20 to be displayed on the touchscreen 14, 16. The visual indicator 20 may be configured to indicate to the user a location and/or a direction of a dynamic touching input that is required in order to cause actuation of the removable memory medium 3. The visual indicator 20 may be configured to indicate the state of the removable memory medium 3. Specifically, the visual indicator may indicate to the user whether the removable memory medium is in its ejected or inserted state.

In the example of FIG. 2A, the visual indicator 20A comprises a slidable icon 20A. The location of the icon 20A indicates a location at which a dynamic touch input must be started in order for the removable memory medium 3 to be actuated. The location of the icon 20A also indicates the state of the memory medium 3 (i.e. whether it is inserted or ejected). In this example, the visual indicator 20 also comprises one or more (in this example plural) arrows 20B for indicating the direction in which the dynamic touch input must be provided. In other examples, the direction of the required dynamic touch input may be indicated to the user simply by the location of the slidable icon relative to a channel 20C in which the icon can be slid. As such, if the icon 20A is provided at one end of the channel 20C (a first position), the user understands that they must provide a dynamic touch input for causing the slidable icon to be slid to the other end of the channel (the second position). In other examples, the direction of the required dynamic touch input may be indicated using colour. For example, the first end of an elongate visual indicator may be a first colour, such as green, and the second end may be a second colour, such as red. The user may therefore understand that, in order to eject the removable memory medium, they must provide the touch input in a direction from green to red (or vice versa). It will of course be appreciated that a number of different colours may be used. In some examples, a check box may be provided at the end of the channel 20C towards which the movement of the dynamic input should be directed.

In this example, the location of the visual indicator 20 relative to the display screen 16 corresponds to the location of the slot 18 for receiving the removable memory medium 3 relative to the electronic device 2. As such, in a device 2 in which the slot 18 for receiving the memory medium 3 is located on a right-hand side of the device 2, the visual indicator 20 is provided on a right hand side of the display screen 16. In addition, if the cavity is located near a top of the device 2, the visual indicator 20 is located provided near a top edge of the display screen 16. Consequently, when the memory 12 medium is inserted, its location relative to the device 2 corresponds to the location of the visual indicator 20 relative to the display screen 16. In this example, the visual indicator 20 is provided on a part of the screen 16 which overlies the location of the removable memory medium 3, when in its inserted state.

The visual indicator 20A may have been displayed in response to a determination that the user desires to eject removable memory medium 3. This determination may result from a user input, or a series of user inputs, indicating the user's desire to eject the removable memory medium 3. The series of inputs may comprise a user navigating to and selecting an option in a menu. Alternatively, the visual indicator may be displayed when the user navigates to a particular page of a menu (but without requiring selection of an option). The page may be, for example, a page that is associated with the memory medium 3. In other examples, the controller 10 may determine automatically that the removable memory medium 3 is to be ejected, for example, because a different removable memory medium 3 needs to be inserted. As such, the controller 10 may display the visual indicator 20 automatically.

In FIG. 2B, the user has applied a dynamic touch input as indicated by the visual indicator 20. In other words, the user has slid their finger 22 over the surface of the touchscreen 14, 16 from the first position of the slidable icon 20A in a direction (as indicated by the arrows 20B) towards the opposite end of the channel 20C. As can be seen in FIG. 2B, controller 10 responds to this dynamic touch input by causing the slidable icon 20A to be moved to its second location.

In response to receiving a dynamic touch input at a predetermined location and in a pre-defined direction (both of which are indicated by the visual indicator), the controller 10 causes actuation of the removable memory medium 3. In this example, the pre-defined direction of the dynamic touch input corresponds with the direction of actuation of the removable memory medium 3. As such, the required input for causing the removable memory medium 3 to be actuated is intuitive to the user.

FIG. 2C shows the electronic device 2 following ejection of the removable memory medium 3. In this example, the controller 10 responds to ejection of the removable memory medium 3 by causing the display screen 16 to indicate that the functionality associated with the removable memory 12 medium 3 is no longer available. In this example, the removable memory medium 3 is a SIM card and so the controller 10 causes the display screen 16 to display the message "Cellular Network Unavailable".

In some examples, in response to receiving the dynamic touch input but before causing actuation of the removable memory medium 3, the controller 10 causes any ongoing operations relating to the removable memory medium 3 to be discontinued or shut down. Subsequent to this, the controller 10 causes the removable memory medium 3 to be ejected. In this way, the removable memory medium 3 can be removed from the device without corrupting or causing damage to data stored on the electronic device 2 or the removable memory medium 3. Often, this process of discontinuing operations such that the medium 3 can be removed safely must be performed manually before removing the memory medium 3. As such, example embodiments reduce the amount of interaction required between the user and the device 2 in order to safely remove a removable memory medium 3. In some examples, the appearance of the visual indicator 20 may be modulated so as to indicate to the user that the ongoing operations relating to the removable memory medium 3 are being discontinued. For example, the visual indicator may be caused to flash or change colour until the operations are actually discontinued. Alternatively the visual indicator 20 could be caused to appear as a progress bar which indicates the progress of the shut down operation. As such, the colour of the indicator 20 may be caused gradually to change from one end of the indicator 20 to the other as the shut down operation progresses.

In examples in which the visual indicator 20A is displayed as part of a menu page, following ejection of the memory medium 3, the visual indicator 20 may indicate that the memory 12 is not present in the slot. For example, the slidable icon 20A may remain in its second position until the removable memory medium 3 is re-inserted into the slot 18. In response to detecting that the removable memory medium 3 has been re-inserted, the controller 10 may cause the slidable icon to be repositioned to its original position.

Figure 3:
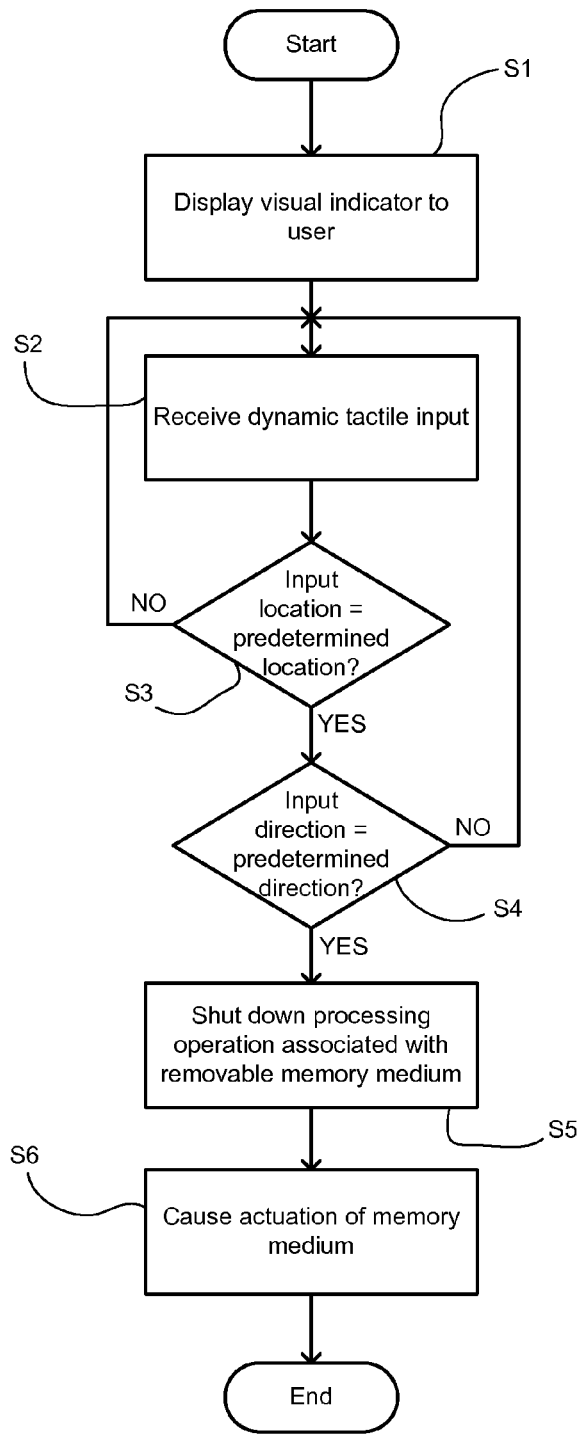
FIG. 3 is a flow chart depicting the example method illustrated in FIGS. 2A to 2C.

FIG. 3 is a flow chart of a method according to example embodiments.

In step S1, the controller 10 causes the visual indicator 20 to be displayed on the display screen 16. The visual indicator 20 may be part of a menu page to which the user has navigated. Alternatively, the visual indicator 20 may have been displayed in response to the user indicating that it is desired to remove the removable memory medium 3 from the device 2.

In step S2, the controller 10 receives signals indicative of a dynamic touch input incident on the touch-sensitive transducer 14.

In step S3, the controller 10 determines if a starting location of the dynamic touch input corresponds to a predetermined location. In examples in which the device comprises a touch screen 14, 16, the predetermined location is a location at which the visual indicator is displayed. If the starting location of the dynamic touch input does correspond to the predetermined location, the controller 10 proceeds to step S3. If the starting location of the dynamic touch input does not correspond to the predetermined location, the method returns to step S2 to await another user input. In some examples, it may not be necessary for the dynamic touch input to start at the predetermined location. Instead, it may be sufficient for the path of the dynamic touch input to coincide at some point with the predetermined location. It will of course be understood that the predetermined location may, in actual fact, be a predetermined area and that it is sufficient for the dynamic touch input to coincide with any location within the area.

In step S4, the controller 10 determines if the direction of the dynamic touch input corresponds to the predefined direction. As described above, the predefined direction may correspond to the direction of actuation of the removable memory medium 3. If the direction of the dynamic touch input does correspond to the predefined direction, the method proceeds to step S4. If the direction of the dynamic touch input does not correspond to the predefined direction, the method returns to step S2 to await another user input.

In step S5, the controller 10 responds to the dynamic touch input by causing operations associated with the removable storage medium 3 to be shut down. This enables the removable memory medium 3 to be removed safely from the electronic device 2.

Finally, in step S6, the controller 10 causes the removable memory medium 3 to be actuated. When the removable memory medium 3 is in its inserted state, the controller causes the removable memory medium to be actuated to its ejected state. In addition, the controller 10 may be operable to provide an indication of this to the user, via the display screen 16. For example, the controller 10 may cause the slidable icon 20A displayed in step S1 to be moved to its second position, thereby indicating that the removable memory medium 3 is its ejected state.

In some examples, such as those which include a slidable tray for receiving the memory medium 3 and for which the actuation causing unit 19 is a motor, the controller may be operable to cause actuation of the removable memory medium 3 from an ejected state to an inserted state. In such examples, the direction of the dynamic touch input required in order to cause insertion of the removable memory medium 3 may be opposite to the direction of the dynamic touch input required in order to cause ejection of the removable memory medium 3.

In other examples, the user may be required manually to insert the removable memory medium 3. This may involve, for example, the user placing the removable memory medium 3 in a tray and then forcing the tray into the slot until the latch mechanism engages the tray. In other examples, the user may simply insert the removable memory medium 3 directly into the slot 18. Regardless of how the memory medium 3 is inserted, the controller 10 may be operable to detect insertion of the memory medium 3 and to cause an indication of this to the user. For example, the controller may be responsive to insertion of the memory medium 3 to cause the slidable icon 20A to be moved to its initial position (thereby indicating that the memory medium 3 is inserted). Additionally or alternatively, in examples in which the memory medium 3 is a SIM card, the insertion of the SIM card may be indicated to the user via an indication that the cellular network is once again available. This may be indicated using, for example, text or an icon displayed on the display 16.

Although the above-described specific example embodiments relate to removable memory media, it will be appreciated that the principles described herein can be applied to any suitable type of member or element which can be removably inserted into an electronic device.

Example embodiments described herein provide an intuitive process for allowing the user of an electronic device easily and efficiently to remove a removable memory medium, such as a SIM card. In addition, because the process does not require manual ejection of the removable memory medium, the device does not require any manually movable parts. Manually movable parts such a hinged doors and the like are often easily damaged and regularly become separated from their electronic device. This may allow unwanted dust and moisture to enter the device. As such, example embodiments may reduce the potential for damage to be caused to the electronic device and thereby may extend the lifespan of the device. Also, because mechanical doors and the like are not required, a more seamless appearance of the device can be obtained.

Although the example embodiments have been described with reference to a touchscreen device, it will be appreciated that the touch sensitive transducer 14 may be a touch pad that is separate from the display 16. In such, examples, the visual indicator 20 may, for example, include an illustration of the touchpad and may denote a location on the touch pad to which the touch input should be provided in order to cause actuation of the removable memory medium 3.

Although the above example embodiments have been described with reference to touch inputs, many touch-sensitive transducers are operable also to detect hover inputs. A hover input is when a user does not actually touch the touch-sensitive transducer 14, but instead positions their finger slightly above the surface of the transducer 14. A dynamic hover input can therefore be provided by the user moving their finger in a direction substantially parallel to the plane of the touch-sensitive transducer 14 but a short distance above the surface of the touch-sensitive transducer 14. The path of a dynamic hover input is defined by the locations on the touch-sensitive transducer at which the hover input is detected as the user moves their finger parallel to the surface.

In view of the above, the term "dynamic input" used herein should be understood to include both dynamic touch inputs and dynamic hover inputs.

In the above-described examples, touch and hover inputs have been provided by a user's finger. It will, however be appreciated that any suitable member for providing such inputs, such as the user's thumb or a stylus, may be used.

Figure 4:
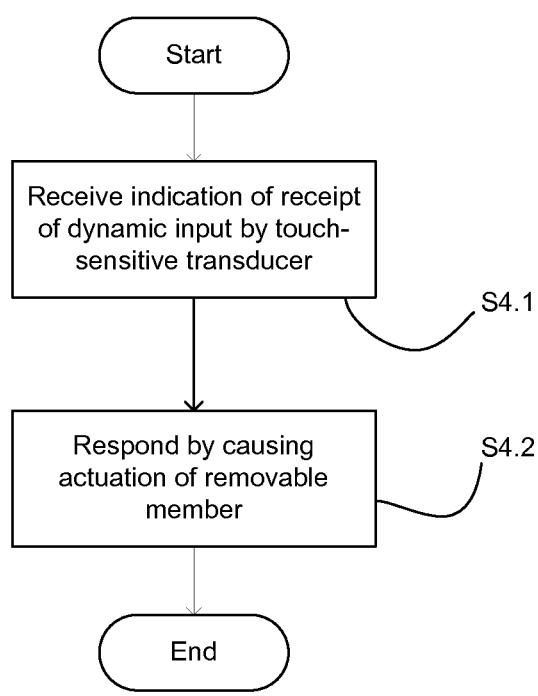
FIG. 4 is a flow chart depicting a generalised method according to example embodiments.

FIG. 4 is a flow chart illustrating a generalised method according to example embodiments. In step S4.1, the controller 10 receives, from a touch-sensitive transducer 14 of an electronic device 2 configured to receive a removable member 3, an indication that a dynamic input has been received by the touch-sensitive transducer 14. In step S4.2, the controller 10 responds by causing actuation of the removable member 3 relative to the electronic device 2.

It should be realized that the foregoing embodiments should not be construed as limiting. Other variations and modifications will be apparent to persons skilled in the art upon reading the present application. Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. An apparatus comprising at least one processor and at least one memory including computer program code, the at least one memory and the computer program code configured, with the at least one processor, to cause the apparatus to:
   receive a swipe input at a location on a touchscreen of the apparatus, the apparatus being configured to receive a removable member, and the swipe input being a swipe touch input or a swipe hover input;
   determine that the location on the touchscreen overlays a location of the removable member; and
   cause ejection of the removable member relative to the apparatus based, at least in part, on the swipe input and the determination that the location on the touchscreen overlays the location of the removable member.

2. The apparatus of claim 1, wherein a direction of movement of the swipe input corresponds to the direction of ejection of the removable member.

3. The apparatus of claim 2, wherein the direction of movement of the swipe input is a direction of movement from the location on the touchscreen, and the direction of ejection of the removable member is a direction of ejection from the location of the removable member relative to the apparatus.

4. The apparatus of claim 1, wherein the location on the touchscreen overlies the location of the removable member when the removable member is received in the apparatus.

5. The apparatus of claim 1, wherein the removable member is a removable memory medium.

6. The apparatus of claim 5, the at least one memory and the computer program code being configured, with the at least one processor, to cause the apparatus to:
cause at least one processing operation associated with the removable memory medium to be shut down in response to the receipt of the swipe input at the location on the touchscreen, wherein the causation of ejection of the removable memory medium relative to the apparatus is performed subsequent to the shutdown of the at least one processing operation associated with the removable memory medium.

7. The apparatus of claim 1, the at least one memory and the computer program code being configured, with the at least one processor, to cause the apparatus to:
cause a visual indicator to be displayed on the touchscreen prior to the receipt of the swipe input, wherein the visual indicator is configured to indicate the location on the touchscreen.

8. A method comprising:
receiving a swipe input at a location on a touchscreen of an apparatus, the apparatus being configured to receive a removable member, and the swipe input being a swipe touch input or a swipe hover input;
determining that the location on the touchscreen overlays a location of the removable member; and
causing ejection of the removable member relative to the apparatus based, at least in part, on the swipe input and the determination that the location on the touchscreen overlays the location of the removable member.

9. The method of claim 8, wherein a direction of movement of the swipe touch input corresponds to the direction of ejection of the removable member.

10. The method of claim 9, wherein the direction of movement of the swipe input is a direction of movement from the location on the touchscreen, and the direction of ejection of the removable member is a direction of ejection from the location of the removable member relative to the apparatus.

11. The method of claim 8, wherein the location on the touchscreen overlies the location of the removable member when the removable member is received in the apparatus.

12. The method of claim 8, wherein the removable member is a removable memory medium.

13. The method of claim 12, comprising:
causing at least one processing operation associated with the removable memory medium to be shut down in response to the receipt of the swipe input at the location on the touchscreen, wherein the causation of ejection of the removable memory medium relative to the apparatus is performed subsequent to the shutdown of the at least one processing operation associated with the removable memory medium.

14. The method of claim 8 comprising:
causing a visual indicator to be displayed on the touchscreen prior to the receipt of the swipe input, wherein the visual indicator is configured to indicate the location on the touchscreen.

15. A non-transitory computer-readable storage medium having stored thereon computer-readable code, which, when executed by an apparatus, causes the apparatus to:
receive a swipe input at a location on a touchscreen of the apparatus, the apparatus being configured to receive a removable member, and the swipe input being a swipe input or a swipe hover input;
determine that the location on the touchscreen overlays a location of the removable member; and
cause ejection of the removable member relative to the based, at least in part, on the swipe input and the determination that the location on the touchscreen overlays the location of the removable member.

16. The medium of claim 15, wherein a direction of movement of the swipe input corresponds to the direction of ejection of the removable member.

17. The medium of claim 15, wherein the predetermined location overlies the location of the removable member when the removable member is received in the apparatus.

18. The medium of claim 15, wherein the removable member is a removable memory medium.

19. The medium of claim 15, further having stored thereon computer-readable code that, when executed by the apparatus, causes the apparatus to:
cause at least one processing operation associated with the removable memory medium to be shut down in response to the receipt of the swipe input at the location on the touchscreen, wherein the causation of ejection of the removable memory medium relative to the apparatus is performed subsequent to the shutdown of the at least one processing operation associated with the removable memory medium.

20. The medium of claim 15, further having stored thereon computer-readable code that, when executed by the apparatus, causes the apparatus to:
cause a visual indicator to be displayed on the touchscreen prior to the receipt of the swipe input, wherein the visual indicator is configured to indicate the location on the touchscreen.

* * * * *